United States Patent [19]
Vogelsang

[11] 3,789,686
[45] Feb. 5, 1974

[54] DEVICE FOR MAINTAINING A CONSTANT CENTER DISTANCE BETWEEN THE OUTPUT SHAFT OF A RESILIENTLY MOUNTED MOTOR AND A DRIVEN MECHANISM

[75] Inventor: Francis H. Vogelsang, Laporte, Ind.

[73] Assignee: Maatschappij Van Berkel's Patent N.V., Rottendam, Netherlands

[22] Filed: Oct. 16, 1972

[21] Appl. No.: 297,983

[52] U.S. Cl. ............................ 74/242.13 A, 74/443
[51] Int. Cl. ......................... F16h 7/10, F16h 55/14
[58] Field of Search ...................... 74/242.13 A, 443

[56] References Cited
UNITED STATES PATENTS
3,207,332   9/1965   Buschbom ............... 74/242.13 A X Primary Examiner—Leonard H. Gerin
Attorney, Agent, or Firm—Lockwood, Dewey, Zickert & Alex

[57] ABSTRACT

The device of the invention maintains constant spacing between the centers of an output shaft of a resiliently mounted motor and the input shaft of a mechanism that is drivingly connected to the output shaft by a transmission assembly where the transmission assembly exerts a force along a line extending through the shaft centers.

18 Claims, 7 Drawing Figures

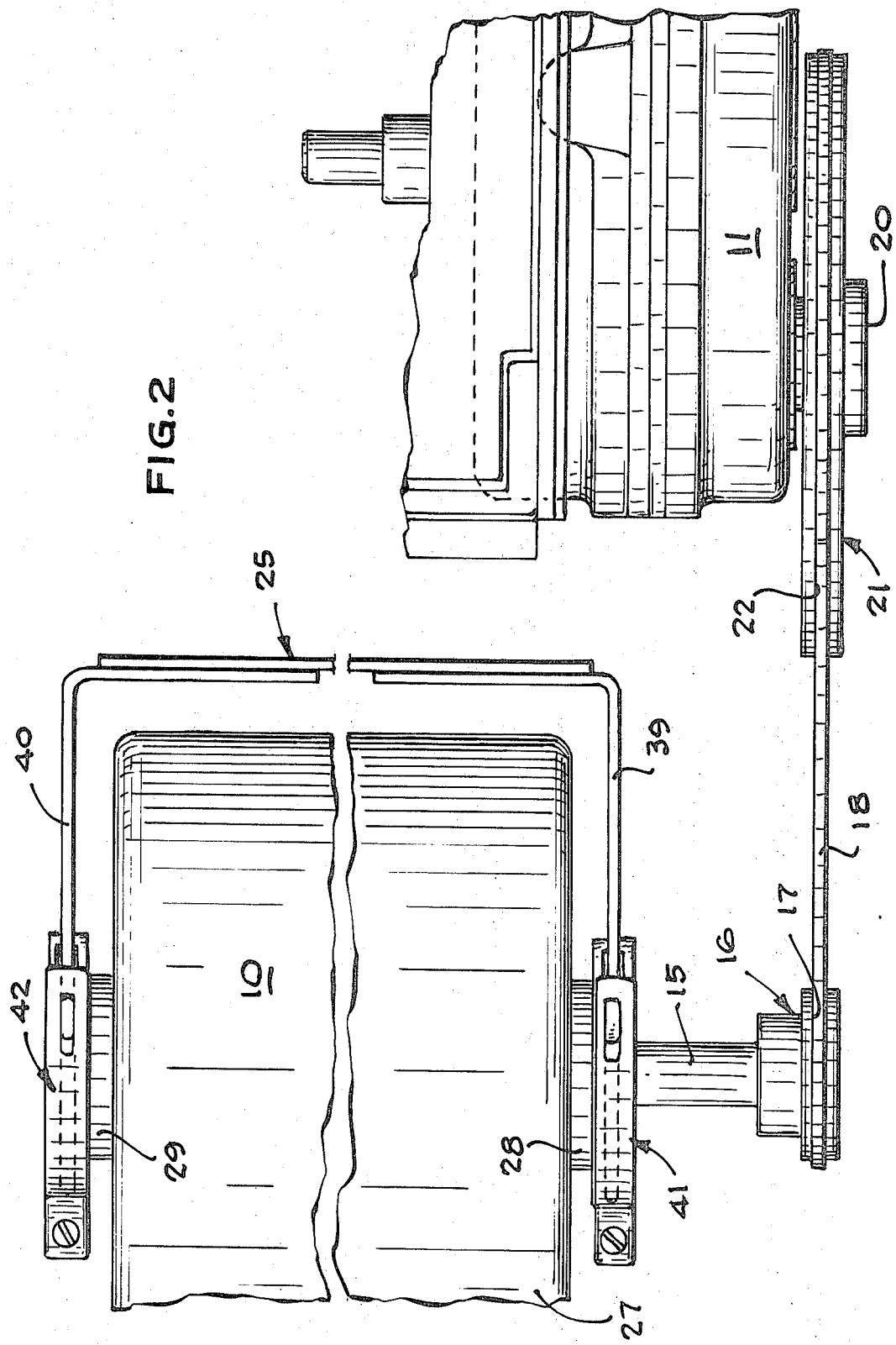

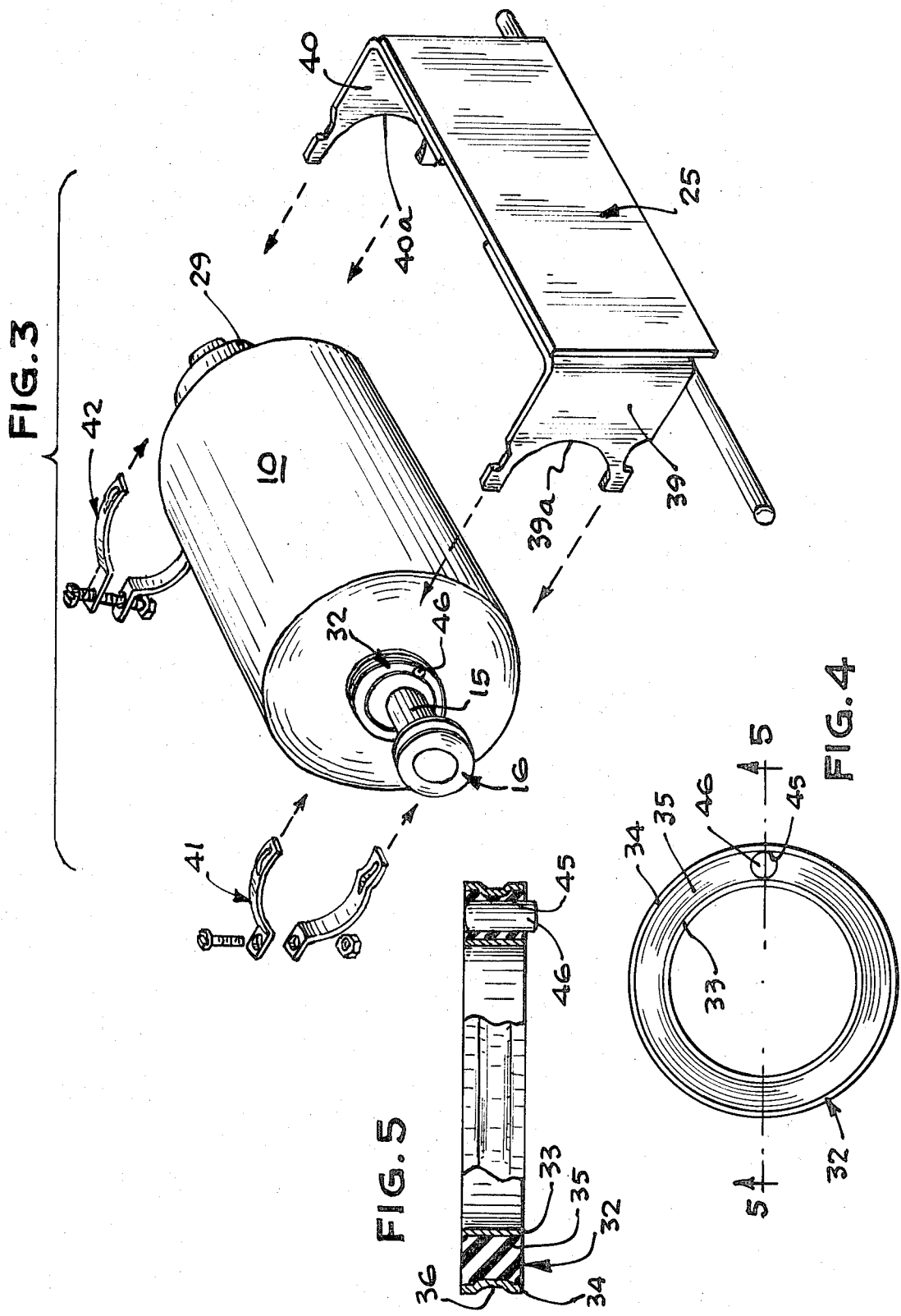

DEVICE FOR MAINTAINING A CONSTANT CENTER DISTANCE BETWEEN THE OUTPUT SHAFT OF A RESILIENTLY MOUNTED MOTOR AND A DRIVEN MECHANISM

This invention relates in general to a device for maintaining a constant center distance between a resiliently mounted motor and a mechanism driven by the motor, and more particularly to a device for maintaining uniform tension on a belt driven by a resiliently mounted motor, although the invention may be used with other power transmission systems.

The transmission of relatively high power from a motor to a driven unit in motor powered appliances was heretofore generally accomplished through gearing. With the advent of new product design where emphasis is on compactness and reduction of costs, attention has been turned to the well known power transmission system of belt and pulleys. This has led to the development of a belt having a relatively small cross-section such as a width on the order of ⅛ inch. This belt is basically made of polyurethane which cannot stand sustained high heat conditions and which requires a relatively high tension in order to transmit adequate power. Slippage of the belt to any degree promptly results in destruction of the belt by virtue of the high frictional heat developed. Such a belt transmission system is highly desirable for small commercial and household appliances, such as meat tenderizers, clothes washers, clothes dryers, and the like. Because the motors are of the AC type, since alternating current potential is almost universally available, a pulsing vibration is generated by the motor which, if transmitted to the appliance frame, is objectionable. This is overcome by resiliently mounting the motor on the appliance frame to torsionally damp the motor.

Such a motor mounting would generally be in the form of a pair of concentrically spaced sleeve supports interconnected by a body of elastomeric material where the inner sleeve support would be normally mounted on the housing of the motor and the outer sleeve support would be connected to a support for the motor which in turn would be carried on the frame. The motor housing might serve as the inner sleeve support. The elastomeric body would be made of suitable resilient material, such as synthetic or natural rubber. Such resilient material is known to undergo a compression set when subjected to a compression force. Accordingly, when such a ring mounting is used to support the end of a motor from which extends the motor shaft carrying a belt pulley or sheave, the tension applied to the belt imparts through the pulley and shaft a compression force on the section of the elastomeric body along the belt transmission line. It will be understood the belt transmission line extends through the centers of the pulleys. The compression set will somewhat collapse the body along the belt transmission line, thereby permitting the inner sleeve, motor housing and motor pulley to move along the line and decrease the belt tension. When this takes place, the tension on the belt is decreased to the extent that the power from the motor sheave cannot be transferred to the drive sheave without causing slippage at the motor sheave which thereafter causes frictional heat build-up on the belt to a degree that causes belt failure. As noted above, polyurethane belts are especially susceptible to degradation when subjected to relatively high heat conditions or the heat conditions capable of being produced by slippage of the sheave on the belt. However, this result would likewise affect any belt whether it be made of polyurethane or some other material.

The present invention overcomes and solves the problem above identified by very simply and inexpensively modifying the resilient ring mounting at the shaft end of the motor housing or the ring mounting at both ends of the housing to prevent compression set of the elastomeric body along the belt transmission line and thereby maintain uniform tension on the belt. More specifically, a spacer of rigid material is applied between the inner and outer sleeves of the ring mounting at a point substantially along the belt transmission line which extends through the centers of the drive and driven sheaves or drive and driven shafts. Further, the present invention could be applied where the transmission system is other than the belt and pulley type where it would be desired to maintain a constant center distance between the motor and driven mechanism. Exemplary would be a gear drive system.

Accordingly, it is an object of the present invention to provide an improvement in a power transmission system for motor driven appliances where power is transmitted from a resiliently mounted motor to the driven mechanism.

It is a further object of the present invention to provide means for maintaining a constant center distance between the shaft of a resiliently mounted motor and the shaft of a mechanism driven by the motor, where the transmission system between the shafts exerts forces either to move the shafts away from or toward each other.

It is a further object of this invention to provide in a ring-shaped resilient mounting for a motor where the mounting includes inner and outer metal sleeves interconnected by a body of elastomeric material a rigid spacing member between the inner and outer sleeves substantially along the line of power transmission.

Another object of the invention is to provide for a belt transmission between a resiliently mounted motor and a mechanism means for maintaining constant belt tension.

Other objects, features and advantages of the invention will be apparent from the following detailed disclosure, taken in conjunction with the accompanying sheets of drawings, wherein like reference numerals refer to like parts, in which:

FIG. 2 is a top plan view of the belt transmission system of FIG. 1 showing some parts broken and some parts in fragmentary for purposes of simplicity;

FIG. 3 is an exploded view of the motor and mounting bracket used in the belt transmission system used in FIGS. 1 and 2;

FIG. 4 is a top plan view of the ring-shaped motor mounting employed at the power transmission end of a motor in accordance with the present invention;

FIG. 5 is an enlarged cross-sectional view taken generally along line 5—5 of FIG. 4 and showing some parts in elevation for purposes of simplicity;

Figure 1:
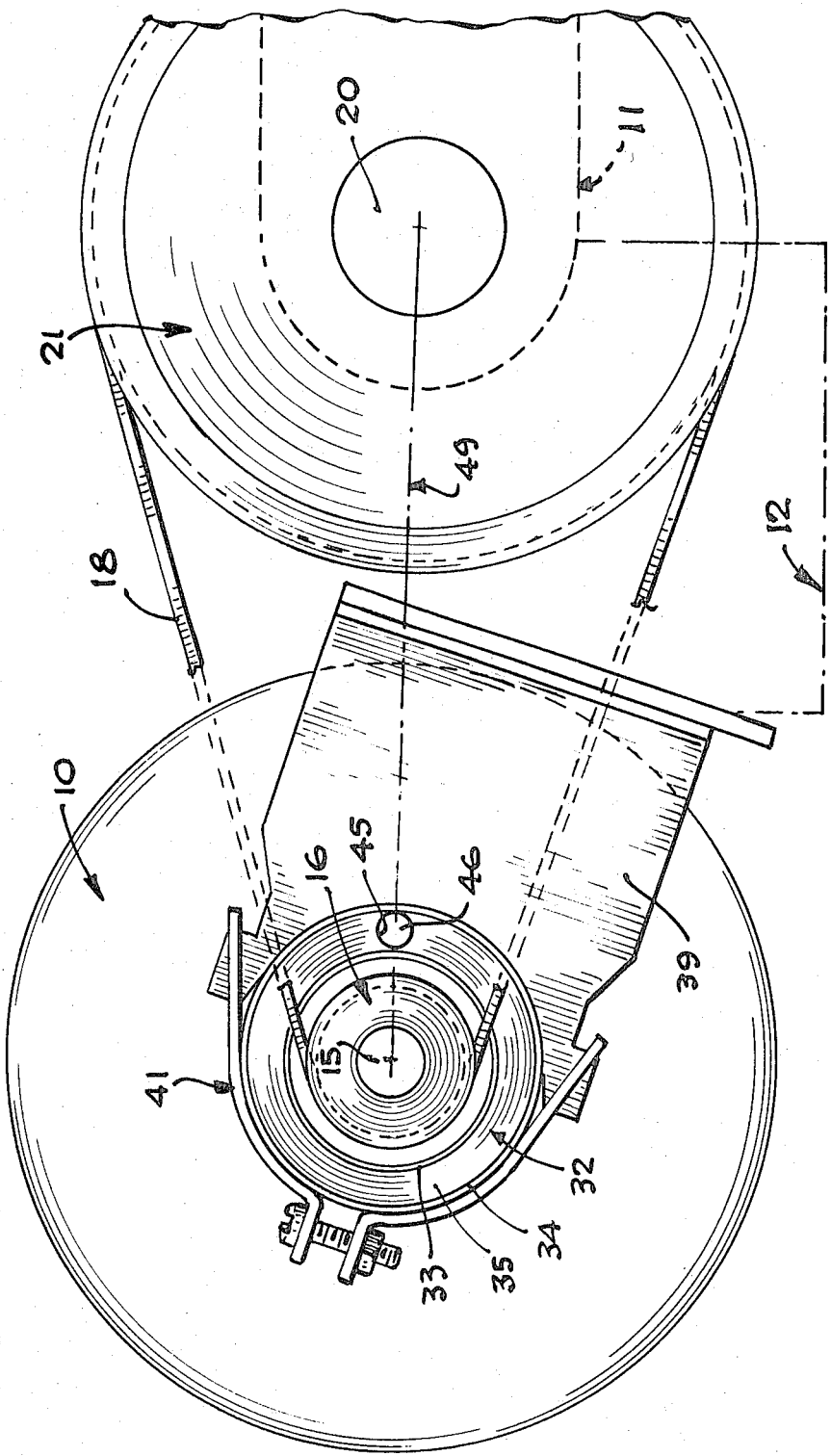
FIG. 1 is a front elevational view of a belt transmission system including the belt tensioning device of the present invention and showing some parts diagrammatically for purposes of simplicity.

Referring now to the drawings and particularly to FIGS. 1 and 2, the belt tensioning device of the invention is illustrated in connection with the transmission of power from an AC electric motor 10 to a mechanism 11, both of which would be supported on a common frame designated by the dot-dash line 12. The mechanism 11 may be for any desired purpose. For example, the mechanism 11 may take the form of a gear box having output shafts for driving meat tenderizing knife rollers in a meat tenderizing machine.

The motor 10 includes a motor shaft 15 having a pulley or sheave 16 mounted thereon for rotation therewith. The sheave 16 includes an annular belt groove 17 for receiving a belt 18. The mechanism 11 includes an input or driven shaft 20 having mounted thereon and for co-rotation therewith a driven pulley or sheave 21. The belt 18 is also trained over the pulley 21 and specifically engages in an annular groove 22. Accordingly, rotational power of the motor is transmitted to the mechanism through the belt 18.

The mechanism 11 is mounted directly to the frame 12 and is therefore stationary with respect to the frame. Similarly, a U-shaped motor bracket or mount 25 is connected to the frame 12 and is stationary with respect to the frame. The motor 10 is supported from the motor bracket 25. The motor 10 includes a housing 27 having formed on opposite ends mounting bosses 28 and 29. The motor shaft 15 extends centrally through the mounting boss 28.

In order to resiliently mount the motor 10 relative to the frame 12 and the bracket 25, ring-shaped resilient motor mounts are secured to the motor housing 27 and in particular the mounting bosses 28 and 29 and to the motor bracket 25. The resilient motor mounting essentially provides a body of elastomeric material between the motor housing and the bracket for the essential purpose of dampening out vibrations caused by the operation of the motor and preventing their transmission from the motor to the motor bracket and frame of the unit. Accordingly, torsional strain is dampened.

The resilient mounting at the motor shaft and at the housing is generally designated by the numeral 32 and includes an inner rigid metal sleeve 33, an outer rigid metal sleeve 34, and a body of elastomeric material 35 interposed between the sleeves. While the sleeves could be of any suitable rigid material, they are preferably of metal. The elastomeric body 35 may be of any suitable resilient material such as synthetic or natural rubber or a plastic. The sleeves are arranged concentrically and in spaced relation and preferably the body of elastomeric material is bonded to the sleeves to provide an integral unit. While the mounting ring referred to is the one at the shaft end of the motor housing, it will be understood that the mounting ring at the other end of the housing will be identical to the ring as described above. Moreover, the mounting ring for convenience of manufacture includes inner and outer sleeve supports for the elastomeric body, but could merely consist of a body of elastomeric material which would be disposed between the motor housing and frame support.

The mounting ring 32 is mounted on the motor by press-fitting the inner sleeve 33 onto the respective housing mounting bosses of the motor. The outer sleeve is provided with an annular groove 36 to facilitate mounting on the bracket 25. Specifically, the bracket 25 includes opposed arms 39 and 40 terminating in essentially semi-circular end faces 39a and 40a which are received in the grooves of the mounting rings. Strap assemblies 41 and 42 coact with the arms 39 and 40 to retain and secure the outer sleeves of the mounting rings in place on the motor bracket 25. Accordingly, the motor is resiliently mounted on the motor bracket and frame by virtue of the elastomeric body in the ring mounts.

When the motor 10 and mechanism 11 are assembled on the frame 12, they are spaced apart such as to establish the necessary tension on the belt 18 for enabling the proper transmission of power from the motor to the mechanism without incurring belt slippage. The tension applied will depend upon the belt used and the amount of power to be transmitted.

In order to maintain the established tension in the belt 18 and to avoid the compression set condition of the elastomeric material in the resilient mounting rings, an opening or hole 45 is provided in the elastomeric body between the inner and outer sleeves for receiving a rigid pin 46. Preferably, the pin is of metal, but it should be appreciated other rigid materials could be employed, it being the purpose of maintaining the spacing between the inner and outer sleeves at the point of insertion of the pin. As seen in FIGS. 4 and 5, the pin 46 is cylindrical and essentially engages on diametrically opposite sides thereof the inner and outer sleeves 33 and 34 to prevent at that place the movement of the sleeves toward each other. At the same time the pin 46 does not interfere with the torsional dampening function of the resilient ring mount, as relative oscillating movement can be still obtained between the inner and outer sleeves. The location of the pin 46 as seen in FIG. 1 is along a line intersecting the centers of the pulleys 16 and 21 and the centers of the shafts 15 and 20 or along the belt transmission line. Preferably, the center of the pin 46 is on the line, which is designated by the numeral 49 in FIG. 1, but it should be appreciated that the placement of the pin may be off this line either way a few degrees without interfering with the function of maintaining the belt tension. Accordingly, the tension of the belt 38 is initially established when mounting the motor and work unit on the frame will be maintained while the advantages of the resilient mounting to dampen torsional vibration will be enjoyed.

It should be appreciated that the pin 46 may be of any desired shape so long as it provides the solid link between the inner and outer sleeve of the mounting ring and still permits relative torsional movement between the sleeves. Further, the mounting ring may take other shapes so long as it is capable of dampening torsional vibration.

Figure 6:
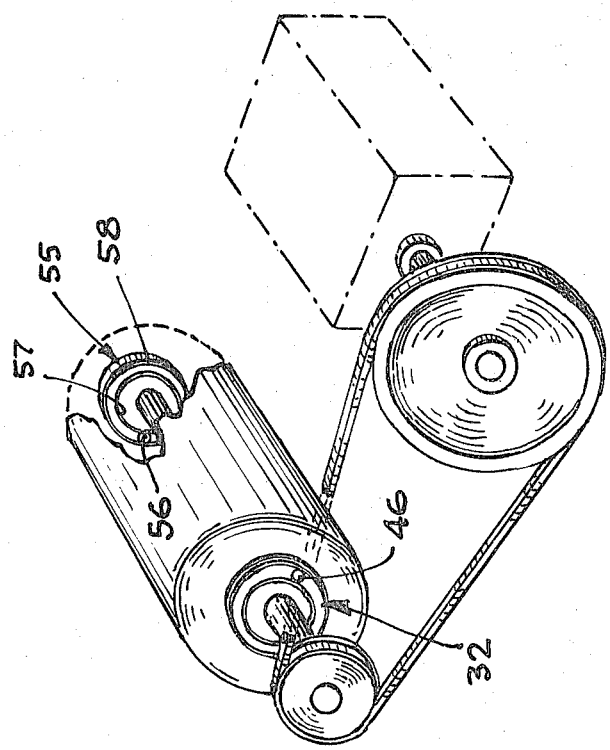
FIG. 6 is a perspective view of a motor utilizing a belt transmission system to drive a mechanism wherein resilient mounting members at each end of the motor include means for maintaining belt tension.

While the mounting ring only at the shaft end of the motor housing generally needs to include the pin for maintaining belt tension, it can be appreciated the mounting ring at the other end of the housing may also include a pin between the sleeve supports, such as shown in FIG. 6. Here the resilient mounting ring 55 is provided with a pin 56 arranged between the inner and outer sleeve supports 57 and 58, and at the side opposite the position of pin 46.

Figure 7:
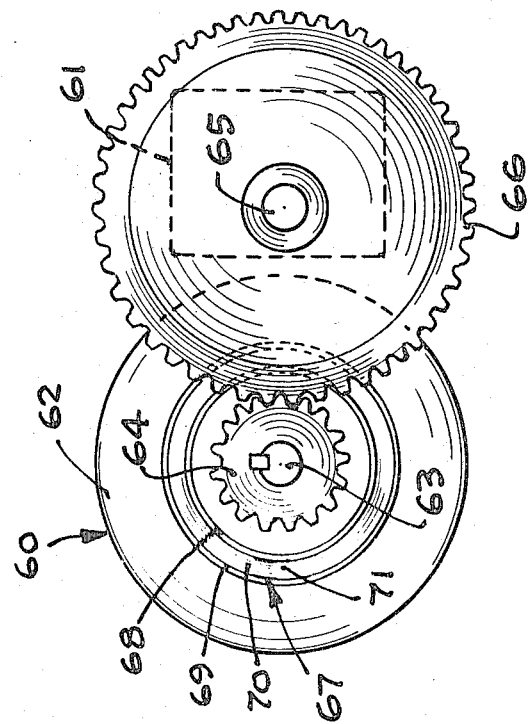
FIG. 7 is a somewhat diagrammatic view of a gear drive transmission system for a resiliently mounted motor illustrating the present invention functioning to maintain constant shaft spacing.

It should be recognized that the present invention would be applicable to any drive system between a resiliently mounted motor and a mechanism where a constant center distance between the motor and mechanism would be required. Another example is illustrated in FIG. 7, where a gear drive transmission system is illustrated between a resiliently mounted motor 60 and a mechanism 61. The motor includes a housing 62 and an output shaft 63 on which is mounted a drive gear 64. Shaft 65 of the mechanism extends parallel to shaft 63. A resilient mounting ring 67 includes an inner metal sleeve support 68 carried on the motor housing 62, an outer metal sleeve support 69 secured to a frame, and a body of elastomeric material 70 disposed between the sleeve supports. A similar mounting ring would be arranged at the end of the motor housing opposite the shaft end and also secured to the frame. The frame would be a common support to the mechanism so initial spacing between the motor shaft and mechanism shaft would be accomplished when the motor and mechanism are secured in place on the frame. In accordance with the invention, a pin 71 is inserted in an opening provided in the elastomeric body 70 of the mounting ring between the inner and outer sleeve supports. However, since the forces exerted by the gear drive tend to move the motor shaft and mechanism shaft away from each other, the pin is positioned on the side of the motor shaft opposite the side that is adjacent to the mechanism and along a line extending through the shaft centers. Accordingly, constant center distance will be maintained between the shafts.

It will be understood that modifications and variations may be effected without departing from the scope of the novel concepts of the present invention, but it is understood that this application is to be limited only by the scope of the appended claims.

The invention is hereby claimed as follows:

1. The combination of a motor having a housing and an output shaft and means resiliently mounting the motor housing on a support to provide torsional damping, a mechanism mounted on the support having an input shaft extending parallel to the motor output shaft, and transmission means for drivingly connecting the motor output shaft and the mechanism input shaft which causes a force on the motor output shaft in a direction along a line perpendicular thereto and collinear with a line extending through the centers of such shafts, and means in said resilient mounting means positioned at the side of the motor output shaft to oppose said force substantially along the center line of the shafts for maintaining a constant spacing between said shafts while permitting the resilient mounting means to perform torsional damping.

2. The combination as defined in claim 1, wherein said resilient mounting means includes a body of elastomeric material bottoming on one side with the housing of the motor and on the other side with the support, and said constant spacing means being disposed in said elastomeric body between said housing and said support.

3. The combination as defined in claim 2, wherein said constant spacing means consists of a rigid pin.

4. The combination as defined in claim 1, wherein said resilient means includes a ring shaped body of elastomeric material encircling the output shaft and disposed between the housing and the support, and said constant spacing means being disposed in said elastomeric body between said housing and said support.

5. The combination as defined in claim 1, wherein said transmission means includes a belt and pulley assembly.

6. The combination as defined in claim 1, wherein said transmission means includes a gear assembly.

7. The combination as defined in claim 1, wherein said resilient mounting means includes an elastomeric assembly at both ends of said housing, and said constant spacing means is provided only in the elastomeric assembly at the output shaft end of the housing.

8. The combination as defined in claim 1, wherein said resilient mounting means includes an elastomeric assembly at both ends of said housing, and said constant spacing means is provided in both said elastomeric assemblies.

9. In a device including a motor and a driven mechanism mounted on a common frame, said motor having a housing and a motor shaft extending therefrom and a pulley on the motor shaft, said driven mechanism having an input shaft with a pulley thereon, a belt trained over the pulleys for transmitting power therebetween, means resiliently mounting said motor on the frame for torsional damping including a resilient mounting element having a first rigid member connected to said motor housing, a second rigid member connected to said frame and spaced from the first rigid member, and a body of resilient material between and interconnecting said rigid members, the improvement in means for maintaining uniform tension on said belt comprising rigid means mounted in said body of resilient material between and in substantial engagement with said first and second rigid members and at the side of the housing adjacent the driving mechanism and substantially along a line extending through the axes of said shafts.

10. The improvement defined in claim 9, wherein said rigid means includes a metal pin substantially engaging the rigid members.

11. The improvement defined in claim 9, wherein said resilient mounting element is in the form of a ring surrounding the motor shaft, and said rigid means is in the form of a metal pin that prevents movement of the rigid members toward each other but does not inhibit relative lateral movement between the rigid members.

12. The improvement defined in claim 11, wherein the pin is in the form of a cylinder and the axis through the center extends substantially parallel to the rotational axis of said motor shaft.

13. The improvement defined in claim 12, wherein the rotational axes of the shafts are in parallel.

14. In a belt drive system including an AC motor having a housing with a motor shaft extending from one end, a resilient mounting ring on the housing at the end adjacent the motor shaft, said ring surrounding the shaft, said mounting ring including an inner metal sleeve press fit on the motor housing, an outer metal sleeve in concentric spaced relation to the inner sleeve, and a resilient body between said inner and outer sleeves, means coupled to the outer sleeve to mount the motor in fixed relation to a frame, a pulley on the motor shaft, a driven mechanism mounted in fixed relation on the frame and having a shaft with a pulley thereon, and a belt trained over said pulleys, the improvement in means for said mounting ring to maintain constant spacing between the sleeves substantially along a line extending through the center of said shafts thereby maintaining constant tension on said belt.

15. The improvement defined in claim 14, wherein said spacing means is in the form of a rigid member essentially engaging the inner and outer sleeves.

16. The improvement defined in claim 15, wherein said rigid member is in the form of a pin the long axis of which is substantially parallel to the motor shaft.

17. In a device including a motor and a driven mechanism mounted on a common frame, said motor having a housing and a motor shaft extending therefrom and a pulley on the motor shaft, said driven mechansim having an input shaft with a pulley thereon, a belt trained over the pulleys for transmitting power therebetween, means resiliently mounting said motor on the frame for torsional damping including a resilient mounting ring having an inner sleeve engaging the motor housing, an outer sleeve in concentric relation to the inner sleeve and connected to the frame, and an elastomer between said sleeves, the improvement in means for maintaining uniform tension on the belt comprising a roller pin positioned between and engaging the inner and outer sleeves, said mounting ring encircling said motor shaft, and said pin being positioned along the mounting ring at a point substantially along a line intersecting the centers of the pulleys.

18. In a belt drive including a motor having a shaft and drive pulley thereon, a device to be driven including a shaft and driven pulley thereon, a belt trained over said pulleys, means for resiliently mounting said motor, and means on said resilient mounting means generally along a line extending through said pulley axes for maintaining the spacing between said pulleys and therefore the tension on the belt.

* * * * *